United States Patent [19]

Merritt

[11] 4,132,205

[45] Jan. 2, 1979

[54] METERING VALVE FOR FUEL INJECTION

[75] Inventor: Robert C. Merritt, Auburn, N.Y.

[73] Assignee: Eaton Corporation, Cleveland, Ohio

[21] Appl. No.: 802,230

[22] Filed: Jun. 1, 1977

Related U.S. Application Data

[63] Continuation of Ser. No. 609,884, Sep. 2, 1975, abandoned.

[51] Int. Cl.[2] .................... F16K 31/524; F02M 39/00

[52] U.S. Cl. .................... 123/139 BC; 123/139 BE; 251/263

[58] Field of Search ..... 123/139 R, 139 BC, 139 AK, 123/139 AL, 139 BE, 32 JV; 251/263, 251; 137/624.13, 624.14, 624.15

[56] References Cited

U.S. PATENT DOCUMENTS

| | | | |
|---|---|---|---|
| 1,814,947 | 7/1931 | McGuinness et al. | 137/624.13 X |
| 1,959,811 | 5/1934 | Brady et al. | 251/263 X |
| 2,521,119 | 9/1950 | Green | 137/624.13 X |
| 2,729,167 | 1/1956 | Links | 123/139 AL |
| 2,852,014 | 9/1958 | Paschke et al. | 123/139 R |
| 2,871,845 | 2/1959 | Holley, Jr. | 123/139 BC |
| 2,935,053 | 5/1960 | Brueder | 123/139 BC |
| 3,720,232 | 3/1973 | Corliss et al. | 137/624.15 X |
| 3,788,251 | 1/1974 | Haak | 251/321 X |

*Primary Examiner*—William R. Cline
*Attorney, Agent, or Firm*—Robert J. McCloskey; Paul A. Rulon

[57] ABSTRACT

Disclosed is a metering valve for a diesel engine fuel injection system. Two injection systems are shown which embody the valve. The valve includes a spool which is moved in one direction by a stepped cam and is moved in the other direction by a spring. The cam moves the spool at a velocity proportional to engine speed. The spring moves the spool at a velocity proportional to the spring force and independent of engine speed. A mechanical fuel distributor prevents fuel metering by the spool when the cam is moving the spool and allows fuel metering when the spring is moving the spool.

18 Claims, 2 Drawing Figures

METERING VALVE FOR FUEL INJECTION

This is a continuation of application Ser. No. 609,884, filed Sept. 2, 1975, now abandoned.

BACKGROUND OF THE INVENTION

1. Field of the Invention

The invention relates to fuel injection for an internal combustion engine and more specifically to a metering valve for such a system.

2. Description of the Prior Art

The advantages of fuel injection are well known. The degree with which the advantages are obtained is governed greatly by the accuracy and timing flexibility of the metering valve or valves in an injection system and ultimately by the cost of the metering valves and system for controlling the valves. An injection system metering valve for a compression ignition engine should meter the quantity of fuel demanded for engine speed and load, should meter an equal quantity to each cylinder at the optimum time and rate, and should sharply control injection pressure rise and fall to the injection nozzle to avoid nozzle dribble and after injection.

Several different basic types of fuel injection systems have been devised. The most successful of the basic types have been the common rail system and the jerk pump system. Many variations and combinations of the basic systems have also been devised. The basic common rail system employs a single pump for maintaining injection pressure to a common header and one or more metering valves. The rate of fuel metering in such systems is a function of time, since injection pressure is constant. The basic jerk pump system employs one or more jerk pumps which provide both the injection pressure and the metering. The rate of fuel injection in such systems is relatively constant with respect to degrees of engine crankshaft rotation; the rate varies greatly with respect to time; and pressure varies greatly with respect to engine speed.

During the past several years common rail systems have had decreasing success with compression ignition engines operating over a wide speed and load range. Compression ignition engines require high injection pressures and the known types of metering valves capable of accurately metering the high pressure fuel required relatively high, synchronized actuating forces. Engine driven actuating mechanisms provided both. However, they also operate the valving members in the metering valves at speeds proportional to engine speed, i.e., increasing engine speeds caused increasing valving member speeds with respect to time, thereby undesirably reducing the quantity of fuel metered, since metering rate is a function of time in such systems. Varying the size of the metering orifice in the valve as a function of engine speed and load was one method of maintaining and increasing, respectively, the quantity of metered fuel. This was costly and complex, as were other methods. Common rail systems have had a rather high degree of success with spark ignition engines, since such engines require a relatively low pressure for manifold injection, whereby the metering valve may be actuated by a solenoid producing relatively low forces.

Injection systems employing jerk pumps, which combine pumping and metering into a single unit, have had a high degree of success with diesel engines. Such systems may have one combined unit supplying several engine cylinders via a distributor or one unit per engine cylinder. In either case the unit often includes a piston and a bore defining a chamber which is expanded and contracted in response to reciprocating movement of the piston. The piston is reciprocated by an engine drive cam at a speed proportional to engine speed. A variable volume of fuel is trapped in the expanded chamber and then impulsively pushed to an engine cylinder in response to the piston moving in a direction contracting the chamber. Such units have several disadvantages due to the high forces required to raise the trapped fuel volume to the high injection pressure required for a diesel engine. The drive train between the piston and the engine must be designed to withstand high torques. If variable injection timing is required, the drive train must include a sturdy phase change mechanism capable of withstanding the high torques required. The high driving forces cause high side loading of the piston; this loading accelerates wear of the piston and the bore. Injection pressures are lower than ideal at low engine speeds and higher than ideal at high engine speeds, since the piston speed is proportional to engine speed. Leakage of fuel from the trapped volume increases with decreasing engine speed. Rise and fall of the injection pressure is rather slow due to the cyclic pumping of the fuel by the piston.

SUMMARY OF THE INVENTION

An object of this invention is to provide a simple and low cost valve capable of metering a very small and accurate pulse of fluid.

Another object of this invention is to provide a fluid metering valve which reduces the cost and complexity of a fluid injection system.

Another object of this invention is to provide a valve which requires relatively low actuating forces while metering highly pressurized fluid, thereby improving the wear life of the valve due to the low actuating forces.

Another object of this invention is to provide a metering valve which sharply controls the pressure rise and fall to the outlet port of the valve.

According to a feature of this invention, the above objects are provided by a valve having a housing defining a bore and spool type valving member which is moved in one direction in the bore by a stepped cam and in the other direction by a spring. The spool includes a metering passage, and the housing includes inlet and outlet ports which communicate with the bore. The metering passage completely traverses at least one of the ports and while doing so momentarily communicates the ports. Distributor or blocking means may be provided either in or associated with the valve to prevent fluid metering when the spool is moved by the stepped cam and allowing metering when the spool is moved by the spring. Since the actuating cam for the valving member is stepped, the valving member may meter fuel independent of engine speed even though the cam is conveniently and synchronously driven by the engine.

BRIEF DESCRIPTION OF THE DRAWINGS

Preferred embodiments of the invention are shown in the accompanying drawing in which.

DESCRIPTION OF FIG. 1

Figure 1:
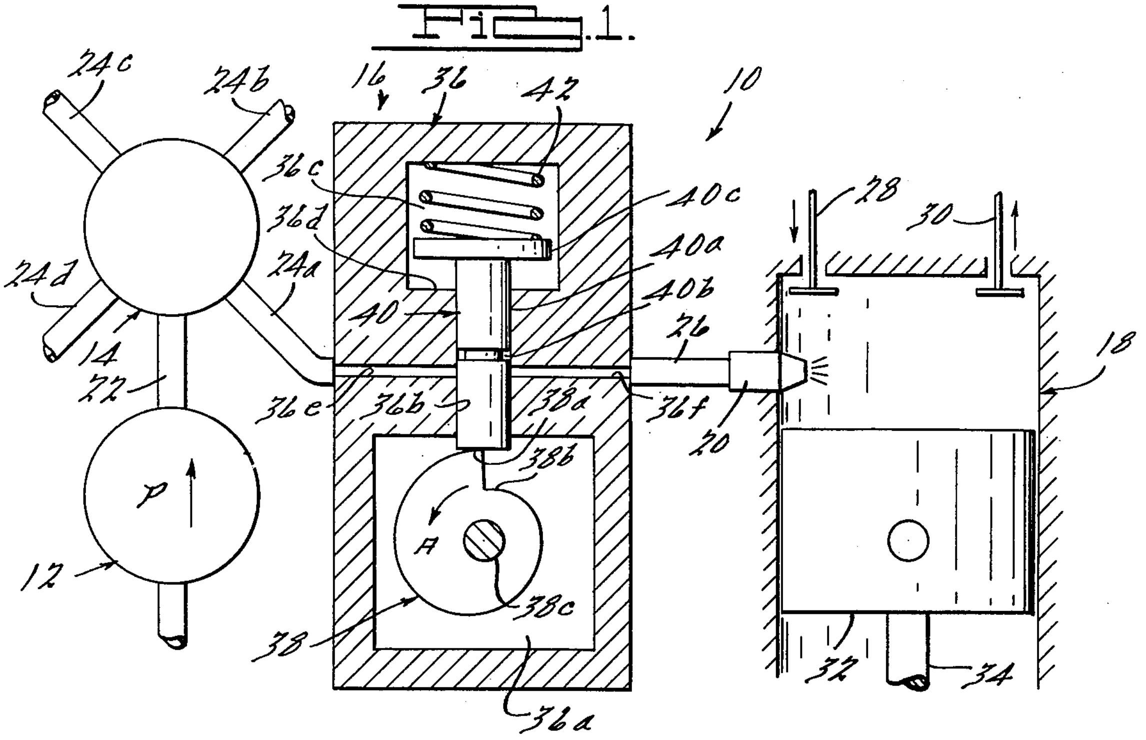
FIG. 1 is a schematic view of an injection system having one injection valve per engine cylinder.

FIG. 1 is a schematic view of a fuel injection system 10 having a high pressure fuel pump 12, a fuel distributor 14, one fuel metering valve 16 for each cylinder 18 of a diesel engine, and one fuel injection nozzle 20 for each cylinder 18. Metering valve 16 is enlarged relative to the other components in system 10 to more clearly show details of the valve.

Pump 12, distributor 14, cylinders 18, and nozzles 20 may be any of several types which are well known in the art. Pump 12 is preferably engine driven and supplies high pressure fuel to distributor 14 via a tube 22. The fuel pressure supplied by pump 12 may be in the order of 4,000 to 10,000 psi. The term high pressure, as used herein, distinguishes the high pressure required for fuel injection into an engine cylinder over the relatively low pressure required for fuel injection into an engine manifold. However, valve 16 may be used with lower pressures for manifold injection.

Distributor 14 may be of the well known type having a fixed disc with a plurality of fuel outlet ports connected to tubes 24*a*, 24*b*, 24*c*, and 24*d* and a rotating disc with a single port which is in constant communication with the high pressure fuel in tube 22. The rotating disc is driven at camshaft speed and is preferably driven by the engine. The inlet port traverses the outlet ports and pressurizes the tubes 24 in the engine firing order. Tubes 24 are each connected to the inlet port of one of the metering valves.

Metering valve 16 is connected to the injection nozzle 20 via a tube 26. Nozzle 20 injects directly into the cylinder 18. Cylinder 18 includes inlet and outlet valves 28 and 30, respectively, and a piston 32 which is driven by the engine crankshaft via a connecting rod 34.

Metering valve 16 includes a housing 36, a stepped cam 38, a spool or valving member 40, and a helical spring 42. Housing 36 includes a cam chamber 36*a*, a bore 36*b*, a spring chamber 36*c* having a shoulder 36*d*, an inlet port 36*e* which communicates tube 24*a* with bore 36*b*, and an outlet port 36*f* which communicates bore 36*b* with tube 26.

Stepped cam 38 includes a lobe or crest portion 38*a* which smoothly increases to a maximum height in the direction of cam rotation, as shown by arrow A, and then abruptly decreases to a minimum height portion 38*b*. Stepped cam 38 is driven by a shaft 38*c* in a timed relation with the distributor at engine camshaft speed and is preferably driven by the engine.

Spool 40 includes a stem portion 40*a* in sliding sealing contact with the wall of bore 36*b*, an annular groove or metering passage 40*b* which divides the stem, and a flange portion 40*c*. Flange portion 40*c* provides a bearing surface for spring 42 and a stop which engages shoulder 36*d* for limiting downward movement of the spool to prevent the spool end in sliding contact with the stepped cam from clashing against the minimum height portion 38*b*.

OPERATION OF FIG. 1

Stem portions 40*a* of spool 40 block communication between ports 36*e* and 36*f* when the spool is in its downward or first position and in its upward or second position. Metering passage 40*b* allows communication between ports 36*e* and 36*f* when the spool is moving between the first and second positions and traversing the ports.

Cam 38 rotates in the direction of arrow A and crest 38*a* moves spool 40 upward in bore 36*b* from the first position to the shown second position at a speed proportional to engine speed. When the crest 38*a* passes spool 40, spring 42 moves the spool back to the first position at a speed proportional to the spring force and independent of engine speed.

Cam 38 rotates in a timed phase relation with distributor 14. The distributor blocks fuel communications between pump 12 and inlet port 36*e*, while the cam is moving the spool from the first position to the second position, thereby preventing fuel metering as metering passage 40*b* traverse ports 36*e* and 36*f*. The distributor allows fuel communication between pump 12 and inlet port 36*e*, while the spring is moving the spool from the second position to the first position, whereby passage 40*b* meters a fuel charge from the inlet port to the outlet port as it traverses the ports.

Cam 38 may be engine driven in any of several well known ways. When so driven, the angular phase relation between cam 38 and the engine crankshaft or camshaft may be varied by using a phase charge device such as disclosed in U.S. Pat. No. 3,827,413, whereby the injection timing of the fuel charges metered by valve 16 may be varied.

As is readily discernible, each fuel charge is metered independent of engine speed even though the valve is engine driven. The amount of fuel metered per charge may be varied as a function of throttle position or other engine parameters by varying the area of the inlet and/or outlet passage in a manner similar to that shown in U.S. Pat. application Ser. No. 403,308, filed Oct. 3, 1973, and assigned to the assignee of this application.

DESCRIPTION OF FIG. 2

Figure 2:
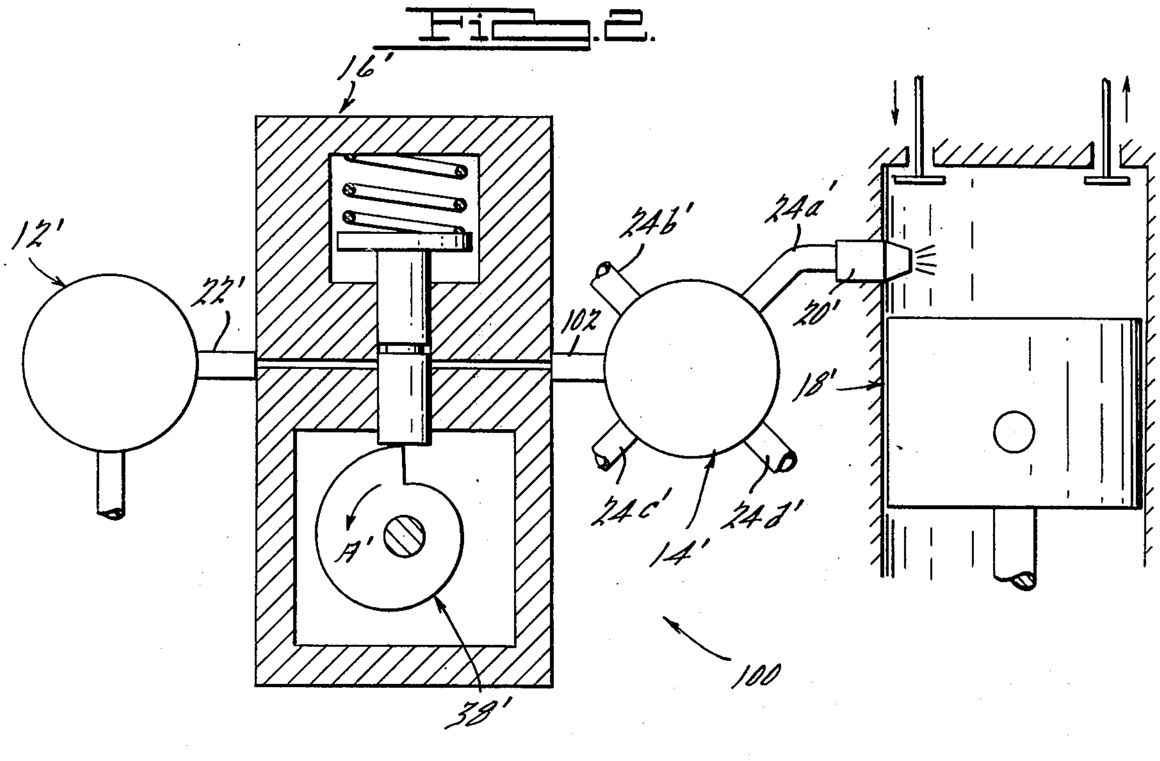
FIG. 2 is a schematic view of an injection system having one injection valve for several engine cylinders.

FIG. 2 schematically illustrates a second fuel injection system embodiment 100. The principle difference between the embodiments of FIGS. 1 and 2 is the number of metering valves required for a multicylinder engine. System 10 employed one metering valve per cylinder; system 100 employs one metering valve for several cylinders. Components of the two systems differ only with respect to their position in the system. Components of system 100 are designated with numerals corresponding to like components of FIG. 1 followed by a prime: Injection system 100 includes a pump 12', a distributor 14' which is communicated with valve 16' via a tube 102 and a nozzle 20' via a tube 24*a*', and an engine cylinder 18'. Tubes 24*b*', 24*c*', and 24*d*' communicate with additional nozzles 20'.

Stepped cam 38' is rotated in a timed phase relation with the distributor, but at an increased rotational speed determined by the number of engine cylinders supplied by the valve. Herein four cylinders are supplied; hence, cam 38 rotates four times faster than the distributor.

Two injection system embodiments have been disclosed along with a metering valve embodiment. The system and valve embodiments have been disclosed for illustrative purposes. Many variations of the embodiments are believed to be within the spirit of the invention.

What is claimed is:

1. A metering valve adapted for use in an injection system of the type including a source of pressurized fluid, a discharge nozzle, passage means for communicating the source with the nozzle, and means for periodically blocking and opening said passage means, said metering valve comprising:

a valve housing having an inlet port and an outlet port adapted to be connected to said source and said nozzle, respectively, by said passage means;

a valving member moveable between first and second positions in said housing and operative to block an interconnection of said ports when in said first and second positions, said valving member including metering means moveable with said valving member for interconnecting said ports when moving between said first and second positions;

resilient means operative to move said valving member from said second position to said first position; and cam means driven in a timed relation with said periodic means and operative to move said valving member from said first position to said second position when the periodic means is blocking said passage and then abruptly allow said valving member to move to said first position in response to the force of said resilient means when the periodic means is opening said passage means.

2. The valve of claim 1, wherein said valving member is a spool valve slideably disposed in a bore in said housing and wherein said cam means includes:

a crest which smoothly increases to a maximum height for moving said spool to said second position and then abruptly decreases to a lower height allowing said resilient means to move said spool toward said first position.

3. The valve of claim 1, wherein said valve housing includes a bore, said inlet and outlet open into said bore, and said valving member is disposed for axial movement in said bore by said cam means and said resilient means, and wherein:

said metering means completely traverses one of said openings as said valving member moves between said first and second positions.

4. The valve of claim 1, wherein said resilient means always provides the same forces for moving said valving member from said second position to said first position.

5. In a fuel injection system of the type including a source of pressurized liquid fuel, a nozzle for delivering the fuel to a piston cylinder of an internal combustion engine, passage means for communicating the source with the nozzle, and means for periodically blocking and unblocking the passage means, wherein the improvement comprises:

a valve housing having a fuel inlet port and a fuel outlet port, respectively, connected with said source and said nozzle;

a valving member moveable between first and second positions in said housing;

cam means operative to move said valving member from said first position to said second position in response to relative movement between said cam means and said valving member and when said periodic means is blocking said passage means; and means operative to move said valving member from said second position to said first position at speeds independent of said relative movement and when said periodic means is unblocking said passage means for effecting a fuel metering by said valving member to said nozzle at a rate independent of the speed of said relative movement.

6. The metering valve of claim 5, wherein said means operative includes:

spring means for moving said valving member from said second position to said first position.

7. The metering valve of claim 5, wherein said cam means includes:

a crest which smoothly increases to a maximum height for moving said valving member to said second position and then abruptly decreases in stepped fashion to a lower height for allowing said means operative to move said valving member from said second position to said first position.

8. The metering valve of claim 5, wherein said valving member includes passage means moveable with said valving member, said passage means blocked from communication with at least one of said ports while said valving member is in said first and second positions and operative to traverse said at least one port while said valving member is moving from said second position to said first position for effecting said fuel metering.

9. The metering valve of claim 8, wherein said means operative includes:

spring means for moving said valving member from said second position to said first position.

10. The metering valve of claim 9, wherein said cam means includes:

a crest which smoothly increases to a maximum height for moving said valving member to said second position and then abruptly decreases to a lower height for allowing said spring means to move said valving member from said second position to said first position.

11. A metering valve for an injection system of the type including a source of pressurized liquid fuel, a nozzle for delivering the fuel to a piston cylinder of an internal combustion engine, passage means for communicating the source with the nozzle, and means for periodically blocking and opening the passage means in a timed relation to the piston, said metering valve comprising:

a valve housing having an inlet port and an outlet port connected to said source and nozzle, respectively, and a bore in communication with said ports;

a valving member disposed in said bore for metering fuel from said inlet to said outlet when said valving member is moving between first and second positions in said bore and for preventing said metering when in said first and second positions;

resilient means for moving said valving member from said second position to said first position; and cam means operative to move said valving member to said second position when said periodic means is blocking said passage means and then abruptly allow said resilient means to move said valving to said first position when said periodic means is opening said conduit.

12. The valve of claim 11, wherein said cam means is in sliding contact with said valving member and includes:

a crest which smoothly increases in the direction of cam rotation for lifting said valving member to said second position and which abruptly decreases to a height allowing said resilient means to move said valving member to said first position.

13. The valve of claim 11, wherein said cam means is driven by said engine and in a timed phase relation therewith.

14. The valve of claim 11, wherein said valving member includes:

metering means defined by said valving member and moveable therewith, said metering means operative to communicate said inlet with said outlet to meter a charge of fluid from said inlet to said outlet during movement of said valving member from said second position to said first position by said resilient means.

15. The valve of claim 14, wherein said valving member is disposed for axial movement in said bore by said cam means and said resilient means, and wherein:

said metering means completely traverses one of said openings as said valving member moves between said first and second positions.

16. The valve of claim 15, wherein:

said cam is driven by said engine in a timed phase relation therewith, whereby said valving member is moved by said cam at velocities proportional to engine speed; and said resilient means moves said valving member at velocities independent of engine speed.

17. The metering valve of claim 16, wherein said resilient means is a spring which moves said valving member at the same velocities independent of engine speed.

18. The valve of claim 11, wherein said resilient means always provides the same forces for moving said valving member from said second position to said first position.

* * * * *